US011066299B1

(12) United States Patent
Fadhel et al.

(10) Patent No.: US 11,066,299 B1
(45) Date of Patent: Jul. 20, 2021

(54) CATALYST COMPOSITIONS HAVING ENHANCED ACIDITY FOR STEAM REFORMING PROCESSES

(71) Applicant: Saudi Arabian Oil Company, Dhahran (SA)

(72) Inventors: Bandar A. Fadhel, Dhahran (SA); Bandar H. Alsolami, Dhahran (SA); Rami Bamagain, Dhahran (SA); Mohammed A. Albuali, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/775,147

(22) Filed: Jan. 28, 2020

(51) Int. Cl.
*C01B 3/40* (2006.01)
*C01B 32/40* (2017.01)
(Continued)

(52) U.S. Cl.
CPC .............. *C01B 3/40* (2013.01); *B01J 35/023* (2013.01); *B01J 35/1014* (2013.01); *B01J 37/009* (2013.01); *C01B 32/40* (2017.08); *C01B 2203/0233* (2013.01); *C01B 2203/0283* (2013.01); *C01B 2203/1058* (2013.01); *C01B 2203/1623* (2013.01); *C01B 2203/1638* (2013.01)

(58) Field of Classification Search
CPC .............. C01B 3/40; C01B 2203/1082; C01B 2203/0244; C01B 2203/1241; B01J 35/026; B01J 35/023; B01J 23/02; B01J 23/78
See application file for complete search history.

(56) References Cited

U.S. PATENT DOCUMENTS 4,017,425 A    4/1977 Shiao
4,451,578 A    5/1984 Setzer
(Continued)

FOREIGN PATENT DOCUMENTS

CN    104627960 A    5/2015
CN    105478120 A    4/2016
(Continued)

OTHER PUBLICATIONS

Smiciklas et al. Effect of acid treatment on red mud properties with implications on Ni(II) sorption and stability Chemical Engineering Journal 242 (2014) 27-35 (Year: 2014).*
(Continued)

*Primary Examiner* — Anthony J Zimmer
*Assistant Examiner* — Syed T Iqbal
(74) *Attorney, Agent, or Firm* — Bracewell LLP; Constance G. Rhebergen; Kevin R. Tamm

(57) ABSTRACT

Methods for steam reforming over a modified red mud catalyst composition, one method including providing a methane feed and a steam feed to react over the modified red mud catalyst composition at increased temperature and increased pressure to produce synthesis gas comprising $H_2$ and CO, the composition comprising red mud material produced from an alumina extraction process from bauxite ore; nickel oxide, the nickel oxide present at between about 5 wt. % to about 40 wt. % of the modified red mud catalyst composition; and a Periodic Table Group VIB metal oxide, the Group VIB metal oxide present at between about 1 wt. % and about 30 wt. % of the modified red mud catalyst composition.

22 Claims, 2 Drawing Sheets

(51) Int. Cl.
  *B01J 35/10* (2006.01)
  *B01J 37/00* (2006.01)
  *B01J 35/02* (2006.01)

(56) References Cited

U.S. PATENT DOCUMENTS

| | | | |
|---|---|---|---|
| 6,340,437 B1* | 1/2002 | Yagi | B01J 23/40 252/373 |
| 10,179,326 B2 | 1/2019 | Basset et al. | |
| 2003/0024806 A1* | 2/2003 | Foret | C10J 3/54 204/164 |
| 2014/0369907 A1* | 12/2014 | Boudreault | C01G 23/07 423/82 |
| 2016/0129423 A1* | 5/2016 | Basset | C07C 2/76 423/651 |
| 2019/0308183 A1 | 10/2019 | Agblevor | |

FOREIGN PATENT DOCUMENTS

| | | |
|---|---|---|
| CN | 107433200 A | 12/2017 |
| GB | 714284 A | 8/1954 |
| GB | 916216 A | 1/1963 |
| JP | S60203694 A | 10/1985 |
| JP | 2007084389 A | 4/2007 |
| RU | 2542177 C1 | 2/2015 |
| WO | 0000285 A1 | 1/2000 |
| WO | 2010118133 A1 | 10/2010 |
| WO | 2019138002 A1 | 7/2019 |

OTHER PUBLICATIONS

Alharthi et al., "Hydrocarbon Cracking Over Red Mud and Modified Red Mud Samples," Journal of Sustainable Metallurgy 2:387-393, 2016.
Balakrishnan et al., "Hydrogen production from methane in the presence of red mud—making mud magnetic," Green Chemistry, 11, 42-47, 2009.
Balakrishnan et al., "Waste materials—catalytic opportunities: an overview of the application of large scale waste materials as resources for catalytic applications," Green Chemistry, 2011, 13, 16.
Bennett et al., "Catalytic Applications of Waste Derived Materials", Journal of Materials Chemistry A, pp. 1-22, 2013.
Dulger Irdem et al. "Steam Reforming of Tar Derived from Walnut Shell and Almond Shell Gasification on Red Mud and Iron-Ceria Catalysts", Energy&Fuels, 2014.
Fang et al., "A Nanomesoporous Catalyst from Modified Red Mud and Its Application for Methane Decomposition to Hydrogen Production," Journal of Nanomaterials, Hindawi, 2016.
Liu et al., "Preparation of Modified Red Mud-Supported Fe Catalysts for Hydrogen Production by Catalytic Methane Decomposition," Journal of Nanomaterials, Article ID 8623463, 2017.
Ortiz et al. "Hydrogen production with CO2 capture by coupling steam reforming of methane and chemical-looping combustion: Use of an iron-based waste product as oxygen carrier burning a PSA tail gas," Journal of Power Sources, 196, pp. 4370-4381, 2011.
U.S. Appl. No. 16/775,019, "Nickel-Containing Catalyst Composition Having Enhanced Acidity for Dry Reforming Processes", filed Jan. 28, 2020.
U.S. Appl. No. 16/775,035, "Nickel-Containing Catalyst Composition Having Enhanced Acidity for Steam Reforming Processes", filed Jan. 28, 2020.
U.S. Appl. No. 16/775,050, "Nickel-Containing Catalyst Composition Having Enhanced Acidity for Autothermal Reforming Processes", filed Jan. 28, 2020.
U.S. Appl. No. 16/775,063, "Nickel-Containing Catalyst Composition Having Enhanced Acidity for Bi-Reforming Processes", filed Jan. 28, 2020.
U.S. Appl. No. 16/775,081, "Catalyst Carrier for Dry Reforming Processes", filed Jan. 28, 2020.
U.S. Appl. No. 16/775,096, "Catalyst Carrier for Steam Reforming Processes", filed Jan. 28, 2020.
U.S. Appl. No. 16/775,102, "Catalyst Carrier for Autothermal Reforming Processes", filed Jan. 28, 2020.
U.S. Appl. No. 16/775,119, "Catalyst Carrier for Bi-Reforming Processes", filed Jan. 28, 2020.
U.S. Appl. No. 16/775,135, "Catalyst Compositions Having Enhanced Acidity for Dry Reforming Processes", filed Jan. 28, 2020.
U.S. Appl. No. 16/775,158, "Catalyst Compositions Having Enhanced Acidity for Autothermal Reforming Processes", filed Jan. 28, 2020.
U.S. Appl. No. 16/775,167, "Catalyst Compositions Having Enhanced Acidity for Bi-Reforming Processes", filed Jan. 28, 2020.
Cheng, et al., "Tar Elimination from Biomass Gasification Syngas with Bauxite Residue Derived Catalysts and Gasification Char", Applied Energy, 258, 2020.
Das, et al., "A Review on Advances in Sustainable Energy Production through Various Catalytic Processes by using Catalysts Derived from Waste Red Mud", Renewable Energy, 143, Elsevier, pp. 1791-1811, May 31, 2019.
Duman, et al., "Hydrogen Production from Algal Biomass via Steam Gasification", Bioresource Technology, 166, pp. 24-30, May 5, 2014.
Ebrahiminejad, et al., "Hydrocracking and Hydrodesulfurization of Diesel over Zeolite Beta-Containing NiMo Supported on Activated Red Mud", Advanced Powder Technology, 30, Elsevier, pp. 1450-1461, dated May 17, 2019.
International Search Report and Written Opinion for PCT Application No. PCT/US2021/015132 dated Mar. 29, 2021.
International Search Report and Written Opinion for PCT Application No. PCT/US2021/015133 dated Mar. 29, 2021.
International Search Report and Written Opinion for PCT Application No. PCT/US2021/015134 dated Mar. 29, 2021.
International Search Report and Written Opinion for PCT Application No. PCT/US2021/015188 dated Mar. 29, 2021.
International Search Report and Written Opinion for PCT Application No. PCT/US2021/015191 dated Mar. 29, 2021.
International Search Report and Written Opinion for PCT Application No. PCT/US2021/015194 dated Mar. 29, 2021.
International Search Report and Written Opinion for PCT Application No. PCT/US2021/015196 dated Apr. 14, 2021.
International Search Report and Written Opinion for PCT Application No. PCT/US2021/015303 dated Mar. 30, 2021.
International Search Report and Written Opinion for PCT Application No. PCT/US2021/015307 dated Mar. 31, 2021.
International Search Report and Written Opinion for PCT Application No. PCT/US2021/015370 dated Apr. 14, 2021.
International Search Report and Written Opinion for PCT Application No. PCT/US2021/015371 dated Mar. 31, 2021.
Irdem et al., "Steam Reforming of Tar Derived from Walnut Shell and Almond Shell Gasification on Red Mud and Iron-Ceria Catalysts", Energy Fuels, ACS Publications, vol. 28, pp. 3808-3813, 2014.
Jahromi, et al., "Hydrodeoxygenation of Aqueous-Phase Catalytic Pyrolysis Oil to liquid Hydrocarbons Using Multifunctional Nickel Catalyst", I&EC research, vol. 57, pp. 13257-13268, Sep. 7, 2018.
Mathur, et al., "Ore Catalysts in Two-Stage Coal Fuel", vol. 65, dated Jun. 1, 1986.
Paredes, et al., "Catalytic Combustion of Methane over Red Mud-Based Catalysts", Applied Catalysis, Environmental, vol. 47, pp. 37-45, Jan. 1, 2004.

* cited by examiner

CATALYST COMPOSITIONS HAVING ENHANCED ACIDITY FOR STEAM REFORMING PROCESSES

BACKGROUND

Field

Embodiments of the disclosure relate to catalyst compositions for use in reforming processes. In particular, certain embodiments of the disclosure relate to Periodic Table Group VIB metal oxide containing catalyst compositions for and methods of steam reforming.

Description of the Related Art

Steam reforming of natural gas is a method of producing commercial bulk hydrogen. Methane and steam are used to produce carbon monoxide and hydrogen (synthesis gas or syngas). In addition, more hydrogen is produced through the water-gas shift reaction. Equation 1 shows the general chemical equation for steam reforming and Equation 2 shows the general chemical equation for the water-gas shift reaction.

$$CH_4 + H_2O \rightleftharpoons CO + 3H_2 \qquad \text{Eq. 1}$$

$$CO + H_2O \rightleftharpoons CO_2 + H_2 \qquad \text{Eq. 2}$$

One challenge in steam reforming is the high thermodynamic potential for coke formation on catalysts. Other challenges include high energy consumption and $CO_2$ emissions. Nickel catalysts with aluminum oxide and magnesium oxide as supports are used in steam reforming.

Present catalyst technology is insufficient in some processes to provide cost-effective and durable means for steam reforming.

SUMMARY

Applicant has recognized a need for compositions of Periodic Table Group VIB (Group VIB) metal oxide containing modified red mud to be applied in systems and processes for steam reforming. Enhanced-acidity Group VIB catalyst compositions are disclosed, in some embodiments further including nickel. The enhanced-acidity Group VIB catalysts also contain in some embodiments Fe, Al, Si, Na, Ca, and Ti oxides from red mud. In embodiments of the present disclosure, red mud acts as a catalyst in addition to or alternative to a catalyst carrier. Disclosed compositions are useful as a catalyst in steam reforming processes for the conversion of methane to syngas, according to Equation 1 in addition to or alternative to Equation 2. Utilization of red mud in steam reforming processes provides the concurrent advantages of utilizing a waste material (red mud) and producing useful $H_2$.

Red mud is a caustic waste material produced from bauxite ore processing for alumina extraction, and is utilized here as a catalyst for a steam reforming process. Surprisingly and unexpectedly, without being specifically designed as a catalyst (for example using specific zeolitic structure), red mud waste material can be readily modified for use as a catalyst. Red mud generally includes a mixture of transition metals such as Ti, Fe, and Al, which make it an advantageous catalyst for steam reforming processes, for example once modified with nickel in addition to or alternative to any one of or any combination of molybdenum, chromium, and tungsten.

Embodiments disclosed here apply red mud as an active catalyst support, promotor, in addition to or alternative to catalyst to produce hydrogen through steam reforming of methane, optionally followed by a water-gas shift reaction to produce additional $H_2$ (Equation 2). Modified red mud compositions of the present disclosure can be used as an active catalyst support, promoter, in addition to or alternative to catalyst in either or both of Equations 1 and 2.

Therefore, disclosed here are methods for steam reforming over a modified red mud catalyst composition, one method including providing a methane feed and a steam feed to react over the modified red mud catalyst composition at increased temperature and increased pressure to produce synthesis gas comprising $H_2$ and CO, the composition comprising: red mud material produced from an alumina extraction process from bauxite ore; nickel oxide, the nickel oxide present at between about 5 wt. % to about 40 wt. % of the modified red mud catalyst composition; and a Periodic Table Group VIB metal oxide, the Group VIB metal oxide present at between about 1 wt. % and about 30 wt. % of the modified red mud catalyst composition. In some embodiments, the Group VIB metal oxide comprises at least one metal selected from the group consisting of: chromium, molybdenum, and tungsten. Still in other embodiments, the increased temperature is between about 500° C. to about 1000° C. In some embodiments, the increased temperature is between about 600° C. to about 800° C. In other embodiments, the increased temperature is about 750° C. In certain embodiments, the increased pressure is between about 5 bar and about 20 bar. In other embodiments, the increased pressure is between about 10 bar and about 15 bar. Still in other embodiments, the increased pressure is about 14 bar.

In some embodiments, gas hourly space velocity of the methane feed and carbon dioxide feed mixed is between about 1000 h$^{-1}$ to 10000 h$^{-1}$. Still in other embodiments, the composition includes at least one component selected from the group consisting of: $Fe_2O_3$, $Al_2O_3$, $SiO_2$, $Na_2O$, CaO, and $TiO_2$. In certain embodiments, a majority of the particles of the composition have a particle size of less than about 70 μm. And in other embodiments, the nickel oxide is present at between about 10 wt. % to about 30 wt. % of the modified red mud catalyst composition.

Still in other embodiments, the nickel oxide is present at between about 15 wt. % to about 25 wt. % of the modified red mud catalyst composition. In certain embodiments, the nickel oxide is present at about 23 wt. % of the modified red mud catalyst composition. In some embodiments, the Group VIB metal oxide is present at between about 1 wt. % to about 20 wt. % of the modified red mud catalyst composition. Still in other embodiments, the Group VIB metal oxide is present at between about 1 wt. % to about 10 wt. % of the modified red mud catalyst composition. In certain embodiments, the Group VIB metal oxide is present at about 5 wt. % of the modified red mud catalyst composition.

In some other embodiments, the method includes the step of carrying out a water-gas shift reaction on the syngas produced in the producing step. In other embodiments, the step of carrying out the water-gas shift reaction applies the modified red mud catalyst composition as a catalyst. In yet other embodiments, a molar ratio of the steam feed to the methane feed is between about 2:1 and about 4:1. Still in other embodiments, produced $H_2$ is at least about 20 mol. % of produced products from the reaction for at least about 5 hours. Still in other embodiments, the Brunauer-Emmett- Teller (BET) surface area of the modified red mud catalyst composition is between about 50 m²/g and about 90 m²/g.

BRIEF DESCRIPTION OF THE DRAWING

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
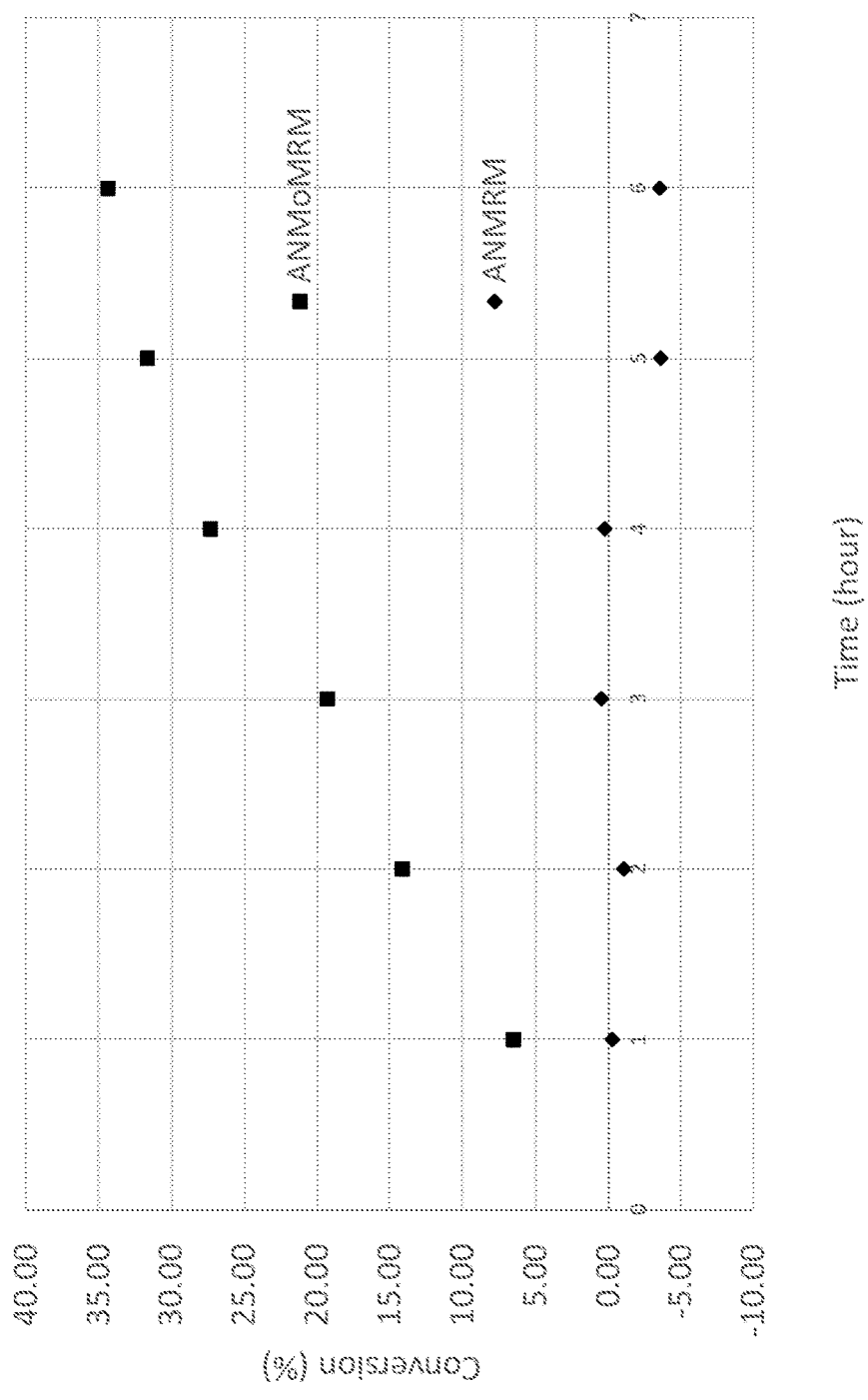
FIG. 1 is a graph showing conversion percentage for $CH_4$ in a steam reforming process for acid nickel-modified red mud (ANMRM) used as a catalyst and for acid nickel-molybdenum-modified red mud (ANMoMRM) used as a catalyst.

So that the manner in which the features and advantages of the embodiments of compositions of Group VIB metal modified red mud along with systems and methods for steam reforming with such compositions and for producing such compositions, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

As noted, red mud is a caustic waste material generated during alumina extraction from bauxite ore. Red mud includes a mixture of transition metals, for example as listed in Table 1.

TABLE 1

Example composition ranges for global red mud.

| Component | $Fe_2O_3$ | $Al_2O_3$ | $SiO_2$ | $Na_2O$ | CaO | $TiO_2$ |
|---|---|---|---|---|---|---|
| Approx. Weight Percentage | 30-60% | 10-20% | 3-50% | 2-10% | 2-8% | 10% |

ANMRM Catalyst Preparation. An acid nickel-modified red mud (ANMRM) catalyst with 18.6 wt. % nickel metal was prepared using a homogeneous precipitation process. Using an unmodified red mud catalyst precursor, 20 wt. % of nickel was targeted to be loaded in the red mud to enhance steam reforming activity, and 18.6 wt. % of nickel was confirmed by X-ray fluorescence (XRF) analysis (about 24% nickel oxide, also referred to as NiO). Depending on the catalyst application, nickel oxide can be loaded to a red mud precursor from between about 1 wt. % to about 50 wt. %.

First, 10 g of Saudi Arabian red mud from Ma'aden Aluminium Company, based at Ras Al Khair, Saudi Arabia was modified by dissolving dried, unmodified red mud in 100 mL of deionized water, and then the pH was neutralized using 40.5 mL of 37 wt. % hydrochloric acid. Afterward, 10 g of nickel(II) nitrate hexahydrate was dissolved in 50 mL of ethanol. The two solutions were mixed, and the final solution was precipitated by slowly adding between about 20 mL to about 30 mL aqueous ammonia with stirring until pH reached 8. Then, the mixed solution was filtered, dried in an oven at 105° C., and calcined at 600° C. for 4 hours. The final ANMRM product was ground to have a particle size of less than about 70 μm. The step of drying in an oven can last from about 2 to about 24 hours.

Other nickel-containing compounds can be used in addition to or alternative to nickel nitrate, including any nickel-containing compounds soluble in ethanol or other organic or inorganic alcohols, or in aqueous ammonia. Nickel can be combined with red mud to result in nickel(II) oxide, NiO, in addition to or alternative to nickel(III) oxide, $Ni_2O_3$.

ANMoMRM Catalyst Preparation. Red mud was modified with nickel and molybdenum to be utilized and tested as a catalyst for steam reforming as follows. In some embodiments, nickel is not required. In some embodiments, nickel in addition to or alternative to any one of or any combination of chromium, molybdenum, and tungsten can be used to modify red mud. Saudi Arabian red mud from Ma'aden Aluminium Company, based at Ras Al Khair, Saudi Arabia was used to prepare a modified catalyst composition. Table 2 shows the weight percent for certain components in the unmodified Saudi Arabian red mud composition.

TABLE 2

Certain component weight percentages in Saudi Arabian red mud (RM) catalyst/catalyst support composition.

| Component | $Fe_2O_3$ | $Al_2O_3$ | $SiO_2$ | $Na_2O$ | CaO | $TiO_2$ |
|---|---|---|---|---|---|---|
| Weight Percentage | 18.75% | 25.22% | 18.88% | 11.77% | 7.97% | 6.89% |

The untreated red mud exhibited a Brunauer-Emmett-Teller (BET) surface area of about 16 m²/g.

Table 3 shows an example composition for one embodiment of produced nickel-molybdenum acid treated red mud for use as a modified catalyst. The unmodified red mud used as a catalyst precursor contained no detectable nickel or molybdenum.

TABLE 3

Example composition for a produced ANMoMRM used as a catalyst.

| Component | $Fe_2O_3$ | $Al_2O_3$ | $SiO_2$ | $Na_2O$ | CaO | $TiO_2$ | NiO | MoO |
|---|---|---|---|---|---|---|---|---|
| Weight Percentage | 16.76% | 21.43% | 19.56% | 2.81% | 2.76% | 5.36% | 23.7% | 5.06% |

Because red mud is a highly variable waste material, elemental composition will vary between samples and test results.

Catalyst Preparation. An acid nickel-molybdenum-modified red mud (ANMoMRM) catalyst with 23.7 wt. % nickel oxide and 5.06 wt. % molybdenum oxide was prepared using a homogeneous precipitation process. Using an unmodified red mud catalyst precursor, 20 wt. % of nickel oxide (also referred to as NiO) was targeted to be loaded in the red mud to enhance steam reforming activity, and 23.7 wt. % of nickel oxide was confirmed by X-ray fluorescence (XRF) analysis. Using the unmodified red mud catalyst precursor, 5 wt. % of molybdenum oxide (also referred to as MoO) was targeted to be loaded in the red mud to enhance steam reforming activity, and 5.06 wt. % of molybdenum oxide was confirmed by XRF analysis. Depending on the catalyst application, nickel oxide can be loaded to a red mud precursor from between about 1 wt. % to about 50 wt. %, and molybdenum oxide, in addition to or alternative to other Group VIB metals, can be loaded to a red mud precursor from between about 1 wt. % to about 50 wt. %.

First, 10 g of Saudi Arabian red mud from Ma'aden Aluminium Company, based at Ras Al Khair, Saudi Arabia was modified by dissolving dried, unmodified red mud in 100 mL of deionized water, and then the pH was neutralized using 40.5 mL of 37 wt. % hydrochloric acid. Afterward, 10 g of nickel(II) nitrate hexahydrate was dissolved in 50 mL of ethanol. Then, 0.92 grams of ammonium molybdate tetrahydrate was dissolved in 50 mL of ethanol. The three separate solutions were mixed to form a mixed solution. Next, the mixed solution was filtered, filtered solids were dried in an oven at 105° C., and then calcined at 600° C. for 4 hours. The final ANMoMRM solid product was ground to have a particle size of less than about 70 µm. The step of drying in an oven can last from about 2 to about 24 hours.

Other nickel-containing compounds and molybdenum-containing compounds can be used in addition to or alternative to nickel nitrate and ammonium molybdate, including any nickel-containing compounds or molybdenum-containing compounds soluble in ethanol or other organic or inorganic alcohols, or in aqueous ammonia. XRF in embodiments of the present disclosure confirmed the presence of nickel and molybdenum oxide loading in the ANMoMRM. Nickel can be combined with red mud to result in nickel(II) oxide, NiO, in addition to or alternative to nickel(III) oxide, $Ni_2O_3$. Molybdenum can be combined with red mud to result in (molybdenum dioxide, $MoO_2$) or Molybdenum(VI) oxide (molybdenum trioxide, $MoO_3$).

BET surface area analysis showed unmodified red mud surface area was about 16 $m^2/g$. BET surface area for acid modified red mud was about 170 $m^2/g$. BET surface area for acid modified red mud with nickel in addition to or alternative to molybdenum loading is, in some embodiments, between about 50 $m^2/g$ and about 90 $m^2/g$, for example about 63 $m^2/g$ or about 89 $m^2/g$.

Catalyst testing. Several tests on ANMRM catalytic activity and ANMoMRM catalytic activity for steam reforming were experimentally conducted. The ANMRM and ANMoMRM catalysts were tested in a Micromeritics® PID Eng & Tech brand microactivity reactor designed for catalyst activity and selectivity analysis. The results are compared, for example, in FIGS. 1 and 2. Results show that ANMoMRM catalytic activity for steam reforming is advantageously improved over ANMRM catalytic activity for steam reforming.

FIG. 1 is a graph showing conversion percentage for $CH_4$ in a steam reforming process for acid nickel-modified red mud (ANMRM) used as a catalyst and for acid nickel-molybdenum-modified red mud (ANMoMRM) used as a catalyst.

Figure 2:
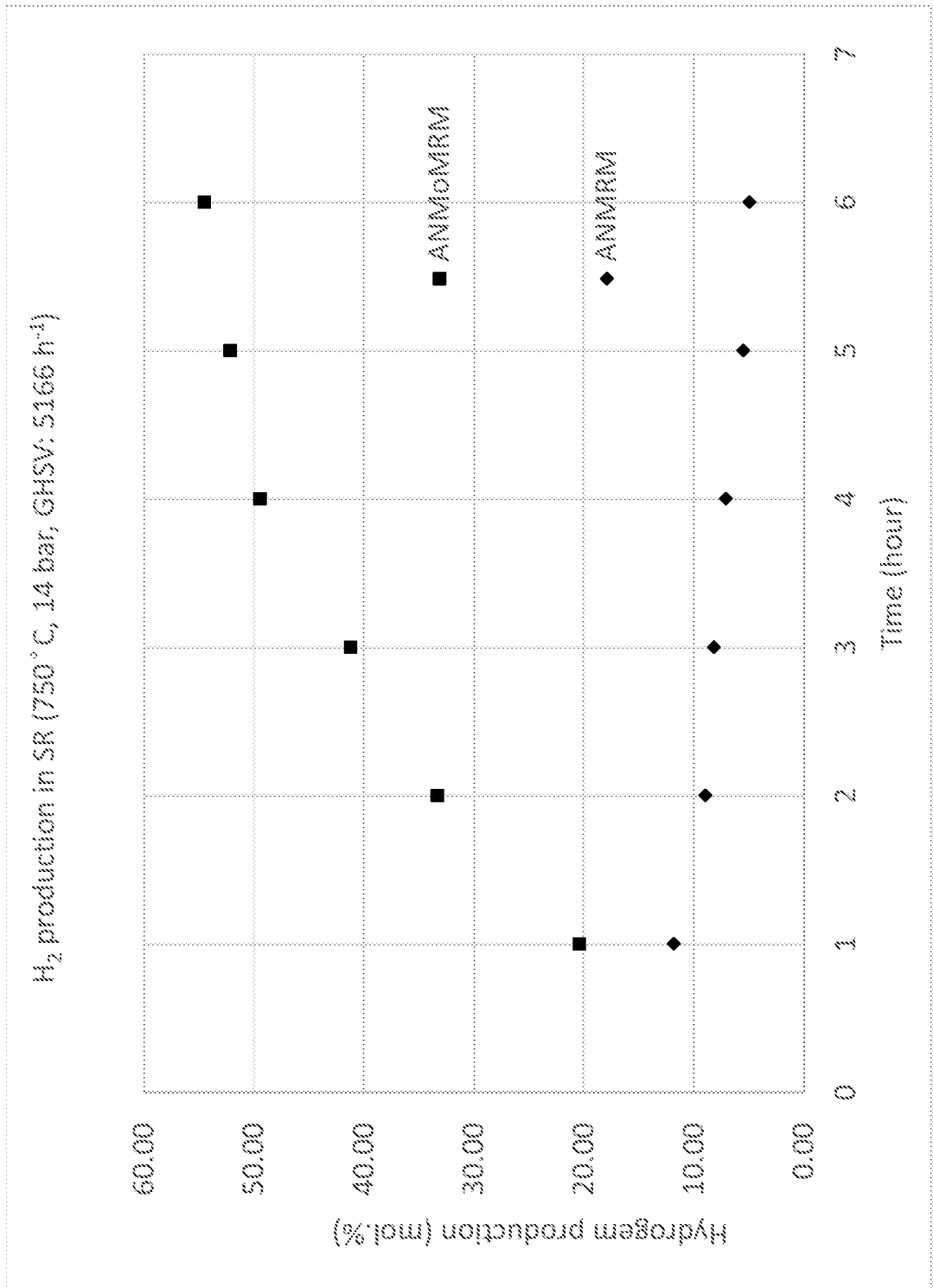
FIG. 2 is a graph showing mol. % of $H_2$ out of the total products produced from steam reforming of $CH_4$ in a steam reforming process for unmodified ANMRM used as a catalyst and for ANMoMRM used as a catalyst.

FIG. 2 is a graph showing mol. % of $H_2$ out of the total products produced from steam reforming of $CH_4$ in a steam reforming process for ANMRM used as a catalyst and for ANMoMRM used as a catalyst. Effects of nickel and molybdenum addition to red mud were studied. Experimental conditions in the steam reforming reactor included temperature at about 750° C., pressure at about 14 bar, and gas hourly space velocity (GHSV) at about 5166 $h^{-1}$. The test was conducted for 6 hours. Based in part on thermodynamics, suitable steam to methane molar ratios can be in a range of about 2:1 to about 4:1. In some embodiments, about 30 mol. % $CH_4$ is combined with 70 mol. % steam in a mixed feed. The GHSV was calculated for the mixed feed. GHSV generally measures the flow rate of the feed gases divided by the catalyst volume, which indicates the residence time of the reactants on the catalyst. For steam reforming, the feed composition will include $CH_4$ and steam. In some embodiments, the feed consists essentially of or consists of methane and steam.

Hydrogen production illustrated in FIG. 2 shows ANMoMRM catalyst outperformed its counterpart, the ANMRM. Hydrogen production by ANMoMRM reached up to about 55 mol. %, and remained above 50 mol. % at 6 hours. On the other hand, ANMRM hydrogen production maxed out at below about 12 mol. %, then deteriorated. The greater conversion rate of ANMoMRM for methane and greater production rate of hydrogen can be attributed to the addition of nickel and molybdenum, and synergies of the nickel and molybdenum with the existing transition metals in the red mud. Molybdenum surprisingly and unexpectedly acts as a synergistic catalyst promoter, shown particularly by FIG. 2.

The singular forms "a," "an," and "the" include plural referents, unless the context clearly dictates otherwise. The term "about" when used with respect to a value or range refers to values including plus and minus 5% of the given value or range.

In the drawings and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:
1. A method for steam reforming over an enhanced-acidity modified red mud catalyst composition, the method comprising the steps of:
providing a methane feed and a steam feed to react in a steam reforming reaction over the enhanced-acidity modified red mud catalyst composition at a temperature between about 500° C. to about 1000° C. and a pressure between about 5 bar and 20 bar to produce synthesis gas comprising $H_2$ and CO, the enhanced-acidity modified red mud composition prepared by a homogeneous precipitation process comprising the steps of:
providing an unmodified caustic red mud waste material produced from an alumina extraction process from bauxite ore;

dissolving in water the unmodified caustic red mud waste material and neutralizing pH of the unmodified red mud waste material with an acid comprising hydrochloric acid;

combining nickel oxide, the nickel oxide present at between about 5 wt. % to about 40 wt. % of the enhanced-acidity modified red mud catalyst composition; and combining a Periodic Table Group VIB metal oxide, the Group VIB metal oxide present at between about 1 wt. % and about 30 wt. % of the enhanced-acidity modified red mud catalyst composition.

2. The method according to claim 1, where the Group VIB metal oxide comprises at least one metal selected from the group consisting of: chromium, molybdenum, and tungsten.

3. The method according to claim 1, where the increased temperature is between about 600° C. to about 800° C.

4. The method according to claim 1, where the increased temperature is about 750° C.

5. The method according to claim 1, where the increased pressure is between about 10 bar and about 15 bar.

6. The method according to claim 1, where the increased pressure is about 14 bar.

7. The method according to claim 1, where gas hourly space velocity of the methane feed and steam feed is between about 1000 h$^{-1}$ to 10000 h$^{-1}$.

8. The method according to claim 1, where the enhanced-acidity modified red mud catalyst composition includes at least one component selected from the group consisting of $Fe_2O_3$, $Al_2O_3$, $SiO_2$, $Na_2O$, $CaO$, and $TiO_2$.

9. The method according to claim 1, where a majority of the particles of the enhanced-acidity modified red mud catalyst composition have a particle size of less than about 70 m.

10. The method according to claim 1, where the nickel oxide is present at between about 10 wt. % to about 30 wt. % of the enhanced-acidity modified red mud catalyst composition.

11. The method according to claim 1, where the nickel oxide is present at between about 15 wt. % to about 25 wt. % of the enhanced-acidity modified red mud catalyst composition.

12. The method according to claim 1, where the nickel oxide is present at about 23 wt. % of the enhanced-acidity modified red mud catalyst composition.

13. The method according to claim 1, where the Group VIB metal oxide is present at between about 1 wt. % to about 20 wt. % of the enhanced-acidity modified red mud catalyst composition.

14. The method according to claim 1, where the Group VIB metal oxide is present at between about 1 wt. % to about 10 wt. % of the enhanced-acidity modified red mud catalyst composition.

15. The method according to claim 1, where the Group VIB metal oxide is present at about 5 wt. % of the enhanced-acidity modified red mud catalyst composition.

16. The method according to claim 1, further comprising the step of carrying out a water-gas shift reaction on the syngas produced in the producing step.

17. The method according to claim 16, where the step of carrying out the water-gas shift reaction applies the enhanced-acidity modified red mud catalyst composition as a catalyst.

18. The method according to claim 1, where a molar ratio of the steam feed to the methane feed is between about 2:1 and about 4:1.

19. The method according to claim 1, where produced $H_2$ from the steam reforming reaction is at least about 20 mol. % of produced products from the steam reforming reaction for at least about 5 hours.

20. The method according to claim 1, where the Brunauer-Emmett-Teller (BET) surface area of the enhanced-acidity modified red mud catalyst composition is between about 50 m$^2$/g and about 90 m$^2$/g.

21. A method for producing an enhanced-acidity modified red mud catalyst composition, the method comprising the steps of:

providing an unmodified caustic red mud waste material produced from an alumina extraction process from bauxite ore;

dissolving in water the unmodified caustic red mud waste material and neutralizing pH of the unmodified red mud waste material with an acid comprising hydrochloric acid;

combining nickel oxide, the nickel oxide present at between about 5 wt. % to about 40 wt. % of the enhanced-acidity modified red mud catalyst composition; and combining a Periodic Table Group VIB metal oxide, the Group VIB metal oxide present at between about 1 wt. % and about 30 wt. % of the enhanced-acidity modified red mud catalyst composition.

22. The method according to claim 21, further comprising the step of adding a basic solution to precipitate the enhanced-acidity modified red mud catalyst composition.

\* \* \* \* \*

UNITED STATES PATENT AND TRADEMARK OFFICE
CERTIFICATE OF CORRECTION

Page 1 of 1

PATENT NO. : 11,066,299 B1
APPLICATION NO. : 16/775147
DATED : July 20, 2021
INVENTOR(S) : Bandar A. Fadhel et al.

It is certified that error appears in the above-identified patent and that said Letters Patent is hereby corrected as shown below:

In the Claims

In Claim 8, Column 7, Line 29, the claim language reads: "least one component selected from the group consisting of" - It should read: --least one component selected from the group consisting of:--; and In Claim 9, Column 7, Line 34, the claim language reads: "70 m." - It should read: --70 μm.--.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*